Patented Sept. 3, 1946

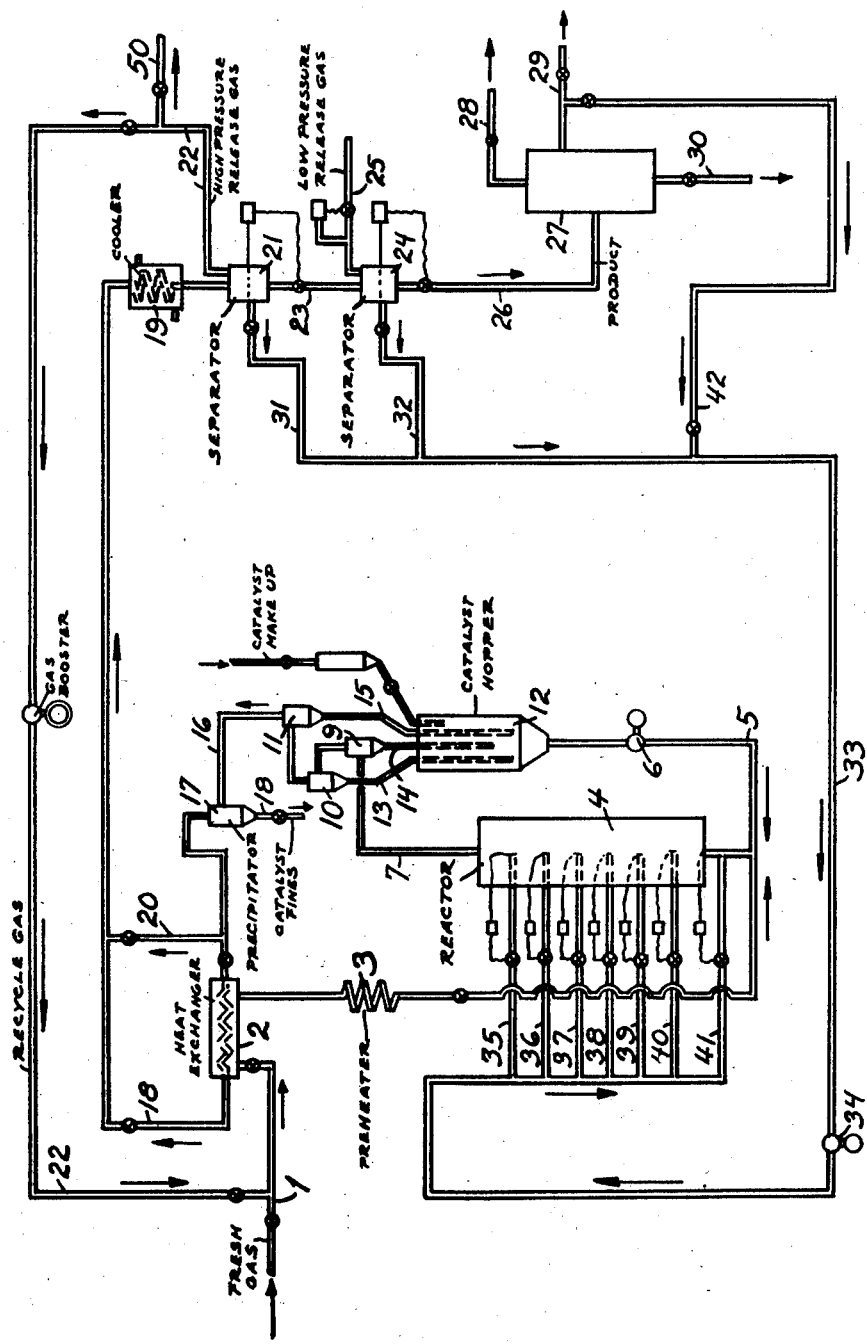

2,406,851

UNITED STATES PATENT OFFICE 2,406,851

FISCHER SYNTHESIS

Aaron K. Redcay, Baton Rouge, La., assignor, by mesne assignments, to Standard Catalytic Company, a corporation of Delaware Application August 15, 1941, Serial No. 406,947

5 Claims. (Cl. 260—449.6)

The present invention is concerned with the production of relatively high molecular weight hydrocarbons by a process involving the hydrogenation of oxides of carbon. The invention is more particularly concerned with an improved method of operating the reaction zone which comprises passing the synthesis gases and suspended powdered catalyst upwardly through the reaction zone and introducing into the reaction zone a recycled portion of the condensed product, preferably at a plurality of stages.

It is known in the art to produce hydrocarbons containing more than one carbon atom in the molecule by hydrogenating oxides of carbon. This reaction is commonly known as the Fischer synthesis reaction. In processes of this character feed gases comprising oxides of carbon and hydrogen are passed through a reaction zone containing a suitable catalyst under conditions to hydrogenate the oxides of carbon to produce higher boiling constituents. Although a wide range of substances may be utilized as the catalyst, the catalysts usually employed are metals of the iron group, such as iron, cobalt and nickel supported on suitable carriers such as kieselguhr or diatomaceous earth.

The temperatures of the reaction also vary considerably and depend to some extent upon the particular catalyst employed and the character of the feed synthesis gases. The reaction may be conducted using a temperature in the range from about 300° F. to about 700° F. However, the usual practice is to carry out the reaction at a temperature in the range from about 360° F. to about 410° F. In these reactions it is essential in order to secure a satisfactory yield of the desired product that the operating temperature be carefully controlled so that it does not vary substantially from the predetermined operating temperature. Thus, for example, it is very desirable to control the reaction so that the temperature does not change in excess of about 10° F. from the predetermined desired operating temperature.

In order to maintain this positive temperature control, various proposals have been made. For example, it has been suggested that the temperature be controlled by absorbing the exothermic heat involved as sensible heat of the catalyst. Suggestions have also been made that the heat of reaction be removed through the side walls of the reaction chamber by circulating a cooling fluid without the walls. I have now discovered an improved process for controlling exothermic reactions of this character.

In accordance with my invention, the reaction is conducted utilizing a suspended powdered catalyst under conditions wherein a cooling fluid is introduced, preferably at a plurality of stages, into the reaction zone. A particularly desirable adaptation of my invention comprises recirculating a fluid catalyst in order to control the temperature in the reaction, and employing in conjunction therewith the injection of a cooling fluid, preferably at a plurality of stages. The process of my invention may be readily understood by reference to the attached drawing illustrating one embodiment of the same.

Referring specifically to the drawing, it is assumed for the purpose of description that the feed synthesis gases comprise oxides of carbon and hydrogen, and that reaction is conducted under conditions to produce hydrocarbons boiling within the motor fuel boiling range. Feed synthesis gases comprising oxides of carbon and hydrogen are introduced into the system by means of line 1, passed through heat exchanging zone 2, through preheating zone 3, and then introduced into the bottom of reaction zone 4. Prior to introducing the gases into the bottom of reaction zone 4 a suspended powdered catalyst adapted to catalyze the reaction is introduced into said gases by means of line 5 and means 6, adapted to maintain pressure on the catalyst. These gases flow upwardly through reaction zone 4 wherein the temperature and pressure conditions are adapted to secure the formation of hydrocarbon constituents containing more than one carbon atom in the molecule.

The reaction products, together with unreacted gases and the catalyst are removed overhead from the reaction zone by means of line 7 and passed serially through catalyst separators 9, 10 and 11. The catalyst is separated in these separators and returned to the main catalyst hopper 12 by means of lines 13, 14 and 15. The reaction gases are removed from separator 11 by means of line 16 and passed to a precipitation zone 17 wherein the final traces of catalyst are separated from the gases and removed by means of line 18. The catalyst-free gases are passed through heat exchanging zone 2 by means of line 18 or may be passed directly to cooler 19 by means of line 20.

The cooled gases are passed into separator 21 wherein the uncondensed gases are removed by means of line 22 and preferably recycled with the fresh synthesis gases to the reaction zone. In order to prevent concentrating inert constituents in the system a portion of these gases may be removed from the system by means of line 50. The condensate is removed from separation zone 21 by means of line 23 and passed into the low pressure separator 24. Vapors are removed from separation zone 24 by means of line 25 while the liquid product is removed by means of line 26 and passed to distillation zone 27. Temperature and pressure conditions are adjusted in zone 27 to remove by means of lines 28, 29 and 30 the desired boiling range fractions.

In accordance with my invention, a portion of the condensed product is recycled to the reaction zone and preferably introduced at a plurality of stages. This is secured by withdrawing a portion of the product either from separation zone 21 by means of line 31 or from separation zone 24 by means of line 32. This product is introduced into reaction zone 4 by means of line 33 and pump 34. In accordance with the preferred modification of my invention, I propose to introduce this product into reaction zone 4 at a plurality of stages by means of lines 35, 36, 37, 38, 39, 40, and 41, respectively. A particularly desirable modification of my invention is to segregate the fraction having a boiling point immediately below the temperature of the reaction. This is secured by segregating a portion of the product removed by means of line 29 and introducing this fraction as described by means of line 42. The desirable fraction comprises the heaviest constituents of the product boiling below the temperature of the reaction. In general, it is desirable that the product added to the reaction zone as described have a final boiling point from 5° to 10° F. below the temperature maintained in the reaction zone.

The process of the present invention may be widely varied. The invention essentially comprises passing synthesis gases upwardly through a reaction zone, which gases contain suspended therein powdered catalyst, and injecting into said reaction zone a cooling liquid preferably at a plurality of stages. The process may be adapted to any reaction wherein exothermic heat is evolved and wherein a suspended powdered catalyst is employed. The invention, however, is particularly applicable in a Fischer synthesis reaction wherein a large amount of heat is evolved and wherein it is essential that the temperature be positively controlled within a narrow critical temperature range. The Fischer synthesis reaction may be conducted using a variety of catalysts and conventional operating temperatures and pressures. By operating as described, it is possible to pass the suspended catalyst upwardly through the reaction zone more efficiently and at the same time remove the exothermic heat of reaction as it is evolved.

It is to be understood that although the preferred adaptation of the invention comprises recycling a portion of the product, the process may under certain conditions be modified wherein other liquids such as water are introduced into the reaction zone as described. As pointed out heretofore, the introduction of liquids into the reaction zone is preferably employed in conjunction with fluid catalyst recycle.

What I claim as new and wish to protect by Letters Patent is:

1. Improved process for the production of hydrocarbons boiling within the motor fuel boiling range which comprises passing a synthesis gas stream containing oxides of carbon and hydrogen and containing suspended therein a powdered catalyst upwardly through a reaction zone, maintaining temperature and pressure conditions in said reaction zone adapted to hydrogenate the oxides of carbon and to form hydrocarbons containing more than one carbon atom in the molecule, removing the reaction products overhead and segregating a portion of the hydrocarbons boiling within the motor fuel boiling range, and returning said segregated portion to said reaction chamber at a point where it will be substantially completely vaporized.

2. Process as defined by claim 1 in which said segregated portion is returned at a plurality of stages to said reaction zone.

3. Process as defined by claim 1 in which said segregated portion comprises the highest boiling constituents of said segregated fraction boiling within the motor fuel boiling range and boiling below the temperature maintained in the reaction zone.

4. In a process for the synthesis of hydrocarbons containing more than one carbon atom in the molecule by reaction of a gas mixture containing hydrogen and carbon monoxide in the presence of a solid catalyst suspended in said gas mixture passing through a reaction zone, the improvement which comprises effecting temperature control of the reaction by separation and return to the reaction zone of a liquid product of the reaction adapted to vaporize substantially completely at the temperature prevailing at its point of entry into the reaction zone.

5. Process according to claim 4, in which the product returned to the reaction zone has a final boiling point from 5° to 10° F. below the temperature of the reaction zone.

AARON K. REDCAY.